Nov. 23, 1948.    H. R. BILLETER    2,454,372
DRILL AND DRILL JIG BUSHING CARRIER ATTACHMENT
Filed June 6, 1946
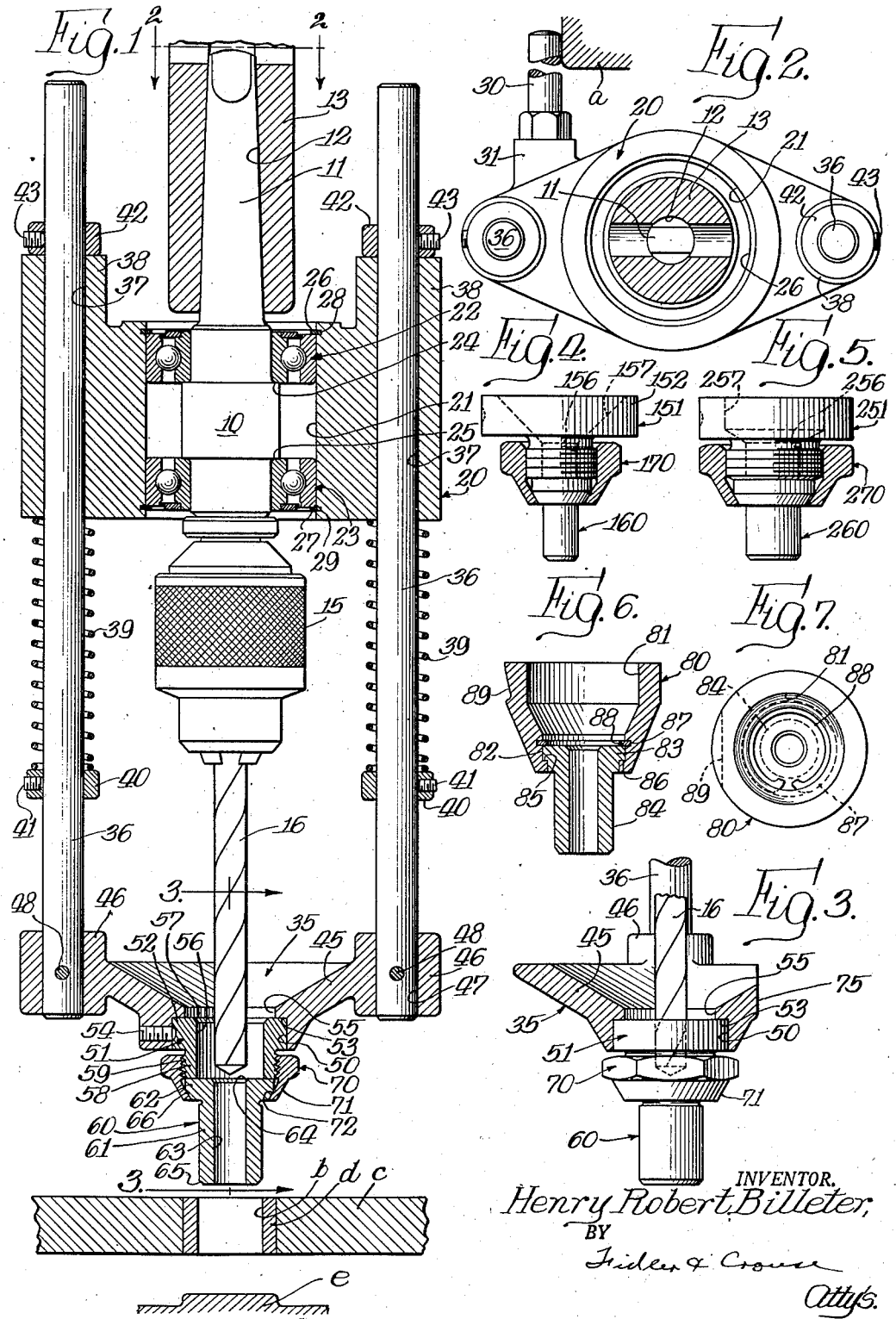
INVENTOR.
Henry Robert Billeter,
BY
Attys.

Patented Nov. 23, 1948

2,454,372

UNITED STATES PATENT OFFICE 2,454,372

DRILL AND DRILL JIG BUSHING CARRIER ATTACHMENT

Henry Robert Billeter, Highland Park, Ill.

Application June 6, 1946, Serial No. 674,846

1 Claim. (Cl. 77—55)

This invention relates to multiple spindle drill presses and it has to do particularly with a drill and drill jig bushing carrier attachment for use in jig drilling operations.

Heretofore, in multiple spindle drill press operations where the work is jig drilled and more than one operation is performed in making a finished hole in the work, it is customary for the operator to insert manually in the jig the proper guide or slip bushing for the operation to be performed. The operator must, therefore, have conveniently available at or on the drill press table the necessary bushings which must be selected and handled by him in each and every operation to be performed. For example, in drilling and reaming a hole, the drill press operator must first select and insert in the jig the proper slip bushing for guiding the drill and the hole is then drilled through such bushing. The drill bushing is then removed and the proper reamer bushing is selected and inserted to guide the reamer. After this latter operation, the reamer guide or slip bushing is removed and the drill bushing again inserted to drill the next piece of work; and, when several holes of the same size are to be drilled, the operator moves one slip or drill guide bushing from hole to hole. This practice involves loss of time on the part of the operator in selecting and inserting the proper bushings, and necessarily increases the time required to finish a piece of work. It also results many times in mistake in the selection of the proper bushing with attendant delay in selecting and reinserting the proper bushing. In addition to this, there is the likelihood that dirt or small chips may get on and adhere to the bushings while they are awaiting use on the drill table, which, if it should occur, would make it very difficult, if not impossible, to insert and remove the bushings from the jig.

In an attempt to overcome the foregoing difficulties and to avoid the necessity of changing bushings when, for example, a hole is drilled and then reamed, it has been the practice, at times, to use a single bushing of proper size to receive and guide the reamer. The first operation is to spot drill to a size corresponding to the size of the hole to be reamed. This is followed by drilling with a drill of less size than the hole to be reamed so as to provide a hole of diameter permitting the reamer to take the necessary bite in the reaming operation, that is, a hole of such size as to leave the necessary reaming stock. In so drilling, the drill enters the spot drill opening and is otherwise insufficiently guided, with the result that, in many instances, a crooked hole is drilled. When the reaming operation is carried out, the shape of the drilled hole will not be corrected because the reamer tends to follow the path of the drilled hole, thus not only making a crooked reamed hole, but causing excessive wear on the reamer and the bushing which is guiding the reamer.

Also, in prior practice, the drill jig fixture is given its final alignment with the tool (drill, reamer or the like) from the tool itself as it enters the jig-carried guide or slip bushing. In this way the tool is subjected to abnormal strains and stresses resulting in inaccurate work and excessive wear which shortens the life of the tool. This prior fault is greatly amplified in the use of small drills, reamers and the like.

One of the objects of this invention is to provide simple and inexpensive means for overcoming the foregoing objectionable conditions in prior practice.

Another object is to provide an attachment for a drill press which will automatically insert a drill jig bushing in a jig fixture when the tool is advanced toward the jig and will automatically withdraw the bushing when the tool is withdrawn from the jig thereby eliminating the need for manual insertion and removal of the bushing.

A further object is to provide an attachment for a drill press which is actuated by the operation of the drill press to move a drill jig bushing into the jig, retain the bushing in the jig until the tool is withdrawn and withdraw the bushing from the jig after the tool has been withdrawn from the work.

Still another object is the provision of a drill and drill jig attachment which may be quickly and easily applied to any one of a number of different types and sizes of drill presses and which may be used with any one of a number of different shapes and sizes of drill jig bushings, whereby the attachment may be manufactured and sold as a stock item.

Another object to provide, as a self-contained unit, a drill and drill jig bushing carrier which will positively and accurately maintain the drill jig fixture and drill jig bushing in alignment with the tool thereby relieving the tool of strains and stresses other than those imposed thereon by the work to be done thereby.

Still another object is to provide an attachment of the foregoing character which is readily and easily adjusted to accommodate tools of different sizes and to position the tool variably with respect to the slip or guide bushing so as to adapt the attachment to all normal working conditions.

A more specific object is to provide a self-contained attachment unit for multiple spindle drill presses which includes a tool shank adapted for universal attachment to the drill press and for support of the tool, a bushing support adjustably carried by the tool shank, and means for detachably mounting a bushing in the bushing support in axial alignment with the tool, the arrangement being such that the tool shank (and tool) rotates relative to the bushing support which is movable axially with and relative to the tool.

Other and more specific objects of the invention are to provide a drill jig bushing carrier adapted to be readily inserted in and securely carried by a drill spindle; to provide for increased accuracy; to provide for reduction in the time required to finish a hole; to provide for elimination of the necessity of handling an assortment of bushings; to provide for the doing of a greater amount of work by a single drill press; to increase the life of the tool and bushing; to provide for efficient use of small tools without danger of distortion and breakage; to provide an attachment for a drill press which will insure that the proper drill jig bushing is inserted in the jig; to provide an attachment which will maintain the drill jig bushing in a position where chips, dirt and other foreign matter will not collect on the bushing; to provide means for yieldingly inserting a drill jig bushing in a drill jig, maintaining the bushing in the jig automatically during the drilling or other machine operation and positively withdrawing the bushing from the jig; to provide an attachment which eliminates the need for a locking device for locking the drill jig bushing in the drill jig; to provide an attachment which permits the operator to observe the entry of the drill jig bushing in the drill jig; to provide means for readily guiding the tool into the drill jig without damage to the tool or drill jig bushing; to provide a bushing carrier adapted to utilize standard drill jig bushings with only slight modification thereof; and to provide an arrangement by which multiple operation of the type here involved may be performed with maximum efficiency in less time and at less cost.

Other objects and advantages of the invention will appear from the following description taken in connection with the appended drawings wherein:

Figure 1 is a fragmentary, vertical, sectional view showing a drill and drill jig bushing carrier attachment embodying the present invention;

Figure 2 is a horizontal, sectional view taken along line 2—2 of Fig. 1;

Fig. 3 is a fragmentary, vertical, sectional view taken along line 3—3 of Fig. 1;

Fig. 4 is an elevational view of a drill jig bushing, and an adapter and adapter nut therefor for use with a drill of smaller size than illustrated in Fig. 1, the nut being sectioned to show the interior construction;

Fig. 5 is a view similar to Fig. 4 only showing a drill jig bushing, adapter and adapter nut suitable for use with a larger drill than the parts shown in Fig. 4;

Fig. 6 is a vertical, sectional view through a bushing and bushing adapter of modified construction; and Fig. 7 is a top plan view of the structure of Fig. 6.

The drill and drill jig bushing carrier attachment constructed in accordance with the present invention is adapted to be used with a drill press of any desired construction, but as will appear more fully hereinafter, is particularly advantageous for use with a drill press where a series of operations is performed in finishing a single hole in a work piece. The invention therefore is especially well adapted for use with a drill press of the multiple spindle type wherein each spindle is adapted to perform a different operation on the same hole in the work piece. For example, the first spindle may drive a drill for drilling a hole of a particular size, and the second spindle may drive a reamer for reaming the hole; or the first spindle may drive a drill, the second spindle may drive a counterbore and the third spindle may drive a tap. Since the details of construction of the drill presses with which the attachment can be used form no part of the present invention such drill presses are not illustrated or described in detail herein. The attachment preferably is so constructed that it can be manufactured and sold as a stock item which can be attached to any standard drill press by a simple operation and without modification of the attachment or the drill press.

Referring now particularly to Fig. 1, the attachment includes a chuck shaft 10 having a tapered shank 11 adapted to be inserted in the tapered bore 12 of a spindle 13 of a drill press (not shown). The shank has a standard taper and is adapted to be attached to standard drill presses by the use of proper adapters where required, in accordance with common practice. Of course, the chuck shaft 10 may, if desired be provided with a tapered socket adapted to receive a tapered shank on the drill press spindle as is sometimes used. The chuck shaft 10 provides convenient means whereby the attachment formed according to the illustrated embodiment can be readily attached to the drill spindle. The chuck shaft 10 carries a drill chuck 15 which may be of any suitable construction and which preferably is of conventional form and which is adapted to receive detachably a tool 16 such as a drill as shown, or reamer or the like. The spindle 13 is rotated by the usual driving mechanism (not shown), and is adapted to be advanced or retracted by suitable mechanism (not shown) in the usual manner to advance the tool into operative relation to a drill jig or to retract the tool.

According to my invention the attachment referred to constitutes a self-contained unit which may be applied to and removed from the drill press spindle without disturbing the operative relationship of the parts. To this end, the attachment further includes a guide head 20 which is mounted on the chuck shaft 10 in such a manner that it moves with the shaft 10 when the latter is advanced or retracted but is held against rotation with the shaft and permits the shaft to rotate within the guide head 20. For this purpose, the guide head 20 constitutes a bearing for the shaft 10, being formed with a bore 21 in which is mounted upper and lower bearings 22 and 23, respectively, in which the shaft 10 is carried. The bearings 22 and 23, which may be formed in any suitable manner and preferably are low friction bearings such as ball bearings of conventional construction, are seated against shoulders 24 and 25 respectively, formed on the shaft 10, and are retained by spring rings 26 and 27 seated in slots 28 and 29. The bearings 22 and 23 are sufficiently rugged and so spaced as to maintain the chuck shaft 11 and the guide head 20 in accurate axial alignment.

The guide head 20 (Fig. 2) is held against rotation by a stop pin 30 secured in a boss 31 and projecting laterally from the guide head 20. The stop pin 30 is positioned to bear against a stationary portion a of the drill press, as, for example, the drill press column, which provides a firm abutment extending vertically a distance at least equal to the range of movement of the guide head 20, and which permits the stop pin 30 to ride up and down with the guide head 20.

The attachment additionally includes a bushing holder 35 for carrying a drill jig slip bushing 60 which is supported from the guide head 20 for movement toward and away from the work piece or drill jig as hereinafter described. The holder 35 is so supported that it is axially movable with and relatively to the drill and the guide head 20 with the drill being driven rotatively. Specifically, the bushing holder 35 is of annular form having a dished body 45 provided at diametrically opposed points with bosses 46 having bores 47 in which the lower end of a pair of vertically extending guide rods 36 are secured by pins 48. The upper ends of the rods 36 are slidably received in bores 37 extending vertically through elongated bosses 38 extending vertically along the opposite sides of the main body of the head 20 in order to provide relatively long guides for accurately maintaining the alignment of the guide rods 36. The extent of downward movement of the guide rods 36 is limited by collars 42 secured thereto by set screws 43, the collars being adapted to engage the upper ends of the slide bosses 38. The guide rods 36 are yieldingly held in extended position relatively to the guide head 20 by springs 39 surrounding the rods 36 and bearing at their upper ends against the guide head 20, and at their lower ends against collars 40 secured on the rods 36 as by set screws 41. The collars 40 and 42 may be adjusted to similar extents to variably position the range of reciprocation of the bushing holder 35 to variably position the holder 35 relative to the drill 16 to accommodate drills or other tools of different size and to variably position the drill or other tool relative to the bushing.

The bushing holder 35 is adapted to detachably support a guide or slip bushing 60. More particularly the body 45 is provided with a central bore 50 forming a socket for mounting the slip bushing 60. In order that slip bushings of various standard sizes may be mounted in the holder 35, an adapter 51 is provided, which has a head 52 seated against a shoulder 53 in the bore 50 and secured in place as by a set screw 54. The adapter 51 carrying the slip bushing 60 thus can be quickly and easily removed and replaced by another adapter carrying a slip bushing of another size.

The slip bushing 60 may be of any suitable form but preferably is generally similar to the type of standard slip bushing and includes a body 61 having a bore 63 extending throughout its length and adapted to receive the drill 16 in close fitting, guiding relation in the usual manner; the upper end 64 of the bore 63 preferably is beveled to aid in guiding the drill 16 therein. The lower end 65 of the body 61 preferably is beveled to aid in guiding the bushing 60 into a drill jig. The bushing 60 has a flange or head 62 which is formed with a taper or bevel 66 to permit it to seat firmly in an adapter nut 70. It is to be understood that where another tool, such as a reamer is employed, a different size bushing will be used.

The slip bushing 60 is securely attached to the adapter 51 by the adapter nut 70 which is screwed onto the threaded tubular body 58 of the adapter 51. The adapter nut 70 is formed with a tapered flange or skirt 71 having an inner face 72 shaped to fit the taper or bevel 66 of the slip bushing and to firmly hold the head 62 of the bushing 60 against the lower end of the adapter body 58.

When the nut 70 is screwed onto the body 58, the tapered surfaces 72 and 66 provide a wedging action which due to the concentricity of the parts insures accurate alignment and prevents any looseness of the slip bushing. Preferably the parts are so dimensioned that when the nut 70 is fully screwed onto the body 58, the lower edge of the nut 70 is flush with the lower surface of the head 62, thereby providing a relatively wide seat or shoulder adapted to bear against the drill jig when the bushing is inserted therein.

The seat 72 in the adapter nut 70 is made of such size that it will accommodate a plurality of standard slip bushings within a given size range after the latter have been given a taper or bevel corresponding to the taper of the seat 72 and after, in some cases, the diameter of the head of the bushing has been slightly reduced. The seat 72 preferably is made slightly smaller than the minimum head diameter of such standard slip bushing. Accordingly all that is necessary to prepare a standard slip bushing for use with the adapter nut is to grind down the head slightly to the diameter of the seat and grind the bevel so that the head will fit the seat properly.

In order to permit the tool 16 to be freely projected through the slip bushing 60, the body 45 is formed with a counterbore 55, and the adapter 51 is formed with a bore 56. The bore 56 preferably is sufficiently larger than the tool 16 to provide a space surrounding the tool which may serve as a well for lubricants in those cases where it is necessary or desirable to provide lubrication for the work. The lubricant is placed in the well and flows down the flutes of the tool and into the hole in the work piece in a manner which will be apparent to those skilled in the art.

The slip bushing 60 is adapted to enter an opening $b$ in a drill jig fixture $c$ to position the tool appropriately with respect to the work piece $e$. The jig $c$ may be provided with a liner bushing $d$ in the usual manner, in which case the opening $b$ is formed in the liner bushing $d$.

In order to permit the operator to readily inspect the bottom of the slip bushing 60 and the top of the liner bushing $d$ so that he can insure that the bushing 60 is being properly guided into the opening $b$ in the liner bushing $d$, the front portion of the bushing carrier 35 may be truncated as indicated at 75 in Fig. 3.

In use, the drill jig and drill jig bushing attachment is assembled as a unit on a drill press of any desired construction by inserting the tapered end 11 of the chuck shaft 10 in the spindle 13 of the drill press. A suitable tool 16, such as a drill, is inserted in the chuck 15 and secured therein in the usual manner. A drill jig bushing 60 of appropriate size is selected and is inserted through the upper end of the corresponding adapter nut 70, the latter being detached from its adapter 51. The adapter 51 which corresponds with the particular nut 70 is then screwed into the upper end of the nut 70 to firmly seat the head 62 of the slip bushing in the tapered skirt 71. Thereafter the adapter head 62 is inserted in the socket 50 and secured therein by tightening the set screw 54.

The work piece $e$ and jig $c$, after having been assembled, are positioned so that the opening $b$ in the liner bushing $d$ is in alignment with the axis of the tool 16. The drill press is then actuated as by the usual handle (not shown) to advance the spindle, with the associated attachment, toward the work piece $e$. In the arrangement illustrated, the bushing holder 35 is yieldably maintained in its lower position, with the slip bushing 60 in advance of the end of the tool 16, and the slip bushing 60 therefore enters the opening b in the drill jig c ahead of the tool 16. Further advance of the spindle 13 carrying the tool chuck 15 and tool 16, causes the tool 16 to be extended through the counterbore 55 in the holder body 45, the bore 56 in the adapter 51, the bore 63 in the slip bushing 60, and the opening b in the drill jig, and to be moved into engagement with the work piece e. This movement of the tool 16 into and through the slip bushing 60 can take place by reason of the yielding support of the bushing holder 35 on the guide head 20. When the shoulder formed by bottom face of the slip bushing head 62 and the lower edge 72 of the adapter nut 70 bears against the upper surface of the jig c, further downward movement of the bushing holder 35 is halted and guide head 20 carrying the chuck 15 and tool 16 advances relatively to the bushing holder 35 with the guide rods 36 sliding in their respective guides 37.

After the desired operation has been performed on the work piece e, the drill press mechanism is actuated to retract the spindle 13 carrying the tool 16 to withdraw the latter from the work piece. The bushing 60 is retained in the jig c, however, by the pressure of the springs 39 until the tool 16 has been retracted to a point where it is completely withdrawn from the work piece e. Further retracting movement of the spindle 13 causes the top surfaces of the bosses 38 to abut against their respective collars 42 and thereby cause the guide rods 36 to lift the bushing holder 35 and withdraw the bushing 60 from the jig c.

The length of the tool (drill, reamer or the like) varies with the diameter, and it is, therefore, necessary to adjust the position of the reciprocating movement of the attachment to accommodate tools of different sizes. Also, it may be desirable in certain instances, to initially position the lower end of the tool within the slip bushing so as to minimize the extent of reciprocation of the tool to engage the work, thereby saving some time in a particular operation. To the foregoing ends, I provide for adjustment or change in position of the reciprocation range of the slip bushing and, in turn, the normal position of the slip bushing relative to the tool by appropriately adjusting the positions of the collars 40 and 42 on the guide rods 36. For example, where a small drill is used for drilling small holes, which drill is necessarily short, the collars 40 and 42 are adjusted to similar extent along the guide rods to bring the lower or free end of the tool into close proximity to or within the slip bushing. The same adjustment is made in the event that the tool, such as the drill 16, is to be initially positioned so that its lower or free end is normally or initially disposed within the slip bushing in close proximity to, but inwardly of, the lower end of such bushing. It will, therefore, be obvious that the adjustability of the range of reciprocation of the bushing holder 35 plays an important part in the attainment of the advantages to be gained by the use of my invention.

The attachment is capable of use with tools and corresponding ship bushings of a large number of different sizes, it being necessary only to provide an adapter and an adapter nut of suitable size to support the slip bushing in the holder. It will be noted that the counterbore 55 in the bushing holder serves no function in guiding the tool, and, therefore, can be made with a sufficiently large diameter to accommodate the largest tool with which the attachment is to be used. Each of the several slip bushings of various sizes may be of generally conventional size and shape except that their heads are suitably tapered to fit in the tapered skirt of the corresponding adapter nut. Each of the adapter nuts is formed in a manner generally similar to the nut above described but of a size corresponding to the particular slip bushing with which the nut is used. The adapter in each case has a body of a size corresponding to the slip bushing, but all of the heads are of the same diameter in order that they will fit in the adapter receiving socket provided in the bushing holder.

Referring to Fig. 4 there is shown a slip bushing 160 for use with a tool of somewhat smaller size than the tool 16 shown in Fig. 1 and secured by an adapter nut 170 of suitable size to an adapter 151. The slip bushing 160 and the adapter nut 170 are of generally similar shapes to the corresponding elements illustrated in Fig. 1, but are of smaller dimensions. The adapter 151, however, has a head 152 which is of a diameter which will fit snugly in the socket 50 (Fig. 1) in the bushing holder 35. Since the adapter 15 is intended for use with a tool of relatively small diameter the opening 156 therein is necessarily of small diameter. Accordingly the upper portion 157 of the opening 156 is inclined or tapered as illustrated in order to provide a lubricating well of adequate capacity.

Referring to Fig. 5 still another size of slip bushing 260 with its associated adapter 251 and adapter nut 270 is illustrated. The slip bushing 260 is of a size for use with a drill somewhat smaller than the tool 16 shown in Fig. 1 but somewhat larger than the tool with which the bushing 160 of Fig. 4 is to be used. In the adapter 251 (Fig. 5) the lubricating well may be formed with an opening 256 having its upper portion 257 partially tapered and partially formed with vertical side walls as illustrated.

Referring to Fig. 6 there is illustrated a somewhat modified form of bushing and bushing adapter in which the necessity for an adapter nut is eliminated. The bushing adapter 80 is formed with a bore 81 and with a counterbore 82 providing a seat for the head 83 of a slip bushing 84, the counterbore 82 being provided with a shoulder 85 against which a corresponding shoulder 86 on the head 83 bears to retain the slip bushing 84. A snap ring 87 is seated in a notch 88 for retaining the slip bushing 84 in its seat. The bushing adapter 80 is generally cylindrical and adapted to seat in the socket of the bushing holder 35 and is formed with a flat 89 for cooperation with the set screw 54 (Fig. 1) for securing the adapter in the socket. It will be seen that the form of bushing adapter illustrated in Figs. 6 and 7 cooperates with the bushing holder 35 (Fig. 1) in the same general manner as the adapters and adapter nuts illustrated in Figs. 1, 4, 5, but that no adapter nut is required for attaching the slip bushing to the adapter.

From the foregoing it will be seen that the present invention provides an attachment for a drill press which will markedly improve the efficiency of drill press operation where a series of operations are performed in finishing the same hole in a work piece. Since the proper slip bushing is maintained in association with the tool being used, the operator does not have to clean, select, insert in the jig and remove the slip bushing for each operation. It is only necessary that he select and insert in the carrier the proper slip bushing adapter and adapter nut (where one is used) at the beginning of a series of operations, thereby avoiding the necessity of handling an assortment of bushings with danger of mistake, tool damage and loss of time. Moreover, since the slip bushing is suspended above the work there is substantially no likelihood that chips, filings, dirt or other foreign matter will collect on and adhere to the exterior of the bushing and be inserted in the liner bushing.

The present invention provides means whereby the necessity of handling separate bushings is avoided, while at the same time avoiding spot drilling and affording true guidance for both the drill and the reamer during their respetcive operations. The invention obtains the intended effect of a spot drilling operation, without the attendant disadvantages and at the same time releases a drill press spindle for another drilling or reaming operation. Thus there is provided an arrangement wherein greater production and improved accuracy of work can be obtained from a drill press resulting in greater efficiency and reduced cost of operation.

The slip bushing and tool are maintained continuously in accurate alignment and hence the tool will always enter the bushing easily and without damaging the bushing or dulling or damaging the tool, as is often the case where a separate bushing is used. Since the bushing is rigidly held in alignment with the tool but is yieldingly maintained in relation to the tool, the bushing can be used as a feeler or guide to insure that the opening in the jig is in true alignment with the tool before the latter is advanced thereinto. Thus, the jig can be given its final alignment from the bushing rather than by the tool, as in conventional practice. The guide rods and their mounting are sufficiently rigid so that even where the attachment is used with a drill jig (and work piece) of substantial size, the slip bushing can be used to move the jig into alignment with the tool. Also the attachment is sufficiently rigid so that this alignment can be effected without bending or injuring the tool even where a small tool is used. Thus the accuracy of the work can be greatly increased in many cases.

The slip bushing is inserted in the jig in guiding relation to the tool, is yieldingly and resiliently held therein during the drilling or other operation and is withdrawn positively after the tool has been withdrawn from the work. Thus, while the slip bushing will enter the jig only if in proper alignment with the opening, the yielding mounting will prevent any damage to the jig, the attachment, or the tool if an attempt is made to insert it while not in alignment. On the other hand, a positive connection is provided for withdrawing the slip bushing from the jig so that considerable withdrawing force can be applied if necessary to overcome any tendency of the bushing to stick in the jig, as may occur, for example, in the event any foreign matter should enter the liner bushing. Since the slip bushing is held in the jig until after the tool has been withdrawn from the work piece, it is not necessary to provide any means such as the usual lock screw or locking lug for locking the slip bushing in the jig. This not only saves the expense of such devices but eliminates the time required to operate them.

By the use of an attachment in accordance with the present invention very rapid, economical operation or series of operations can be carried out. The operator need only operate the drill press handle to move the tool (and the slip bushing carried by the spindle) toward and away from the drill jig, making sure that the slip bushing enters the jig. Since the slip bushing can be adjusted to receive and guide the tool at all times, and the necessity of moving the tool into and through the bushing is eliminated, some time is therefore saved in each cycle of operation. Since the slip bushing is withdrawn from the jig automatically by the retracting movement of the spindle, the operator need give this operation no especial attention, but can devote his attention to preparing to move the jig and work piece into position under the next spindle. In practical applications of the present invention, production increases in excess of 80% over prior methods of operation have been achieved, all with greater accuracy and at less cost.

I believe that the operation and advantages of my invention will be well appreciated from the foregoing description, and it is to be understood that, while I have shown and described several forms of my invention, other details and arrangements of parts may be resorted to without departing from the spirit and scope of my invention as defined by the claim that follows.

I claim:

A drill and drill jig bushing carrier assembly comprising a tool chuck shaft formed at one end for detachable engagement with a drill press spindle for support and rotation thereby and carrying a tool support at the other end for detachably receiving a tool, a drill jig bushing, a carrier for supporting said bushing in axial alignment with a tool in said tool support and for movement toward and away from the tool, and including a guide head, a guide element slidable in said guide head, a bushing holder carried at the end of said guide element away from said guide head and detachably carrying said bushing, a spring acting between said guide head and said guide element for yieldingly urging said bushing holder away from said guide head, and adjustable stops on said guide element one of which serves as an abutment for said spring and the other of which is adapted to abut said guide head to determine the normal position of said guide element, and bearing means in said guide head journalling said tool support in said guide head.

HENRY ROBERT BILLETER.

REFERENCES CITED

The following references are of record in the file of this patent:

UNITED STATES PATENTS

| Number | Name | Date |
| --- | --- | --- |
| 1,465,236 | Briney | Aug. 14, 1923 |
| 1,470,143 | Buterbaugh | Oct. 9, 1923 |
| 2,170,211 | Osborne | Aug. 22, 1939 |
| 2,360,942 | Ellerstein | Oct. 24, 1944 |
| 2,374,874 | McKee | May 1, 1945 |
| 2,382,639 | Kennard | Aug. 14, 1945 |
| 2,426,124 | Skwierawski | Aug. 19, 1947 |

FOREIGN PATENTS

| Number | Country | Date |
| --- | --- | --- |
| 373,746 | Great Britain | June 2, 1932 |